United States Patent
Mohlin

(10) Patent No.: US 11,371,444 B2
(45) Date of Patent: Jun. 28, 2022

(54) INTERNAL COMBUSTION ENGINE AND A METHOD FOR CONTROLLING A BRAKING TORQUE OF THE ENGINE

(71) Applicant: VOLVO TRUCK CORPORATION, Gothenburg (SE)

(72) Inventor: Anders Mohlin, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/333,251

(22) PCT Filed: Jun. 30, 2017

(86) PCT No.: PCT/EP2017/066344
§ 371 (c)(1),
(2) Date: Mar. 14, 2019

(87) PCT Pub. No.: WO2018/065131
PCT Pub. Date: Apr. 12, 2018

(65) Prior Publication Data
US 2020/0200103 A1     Jun. 25, 2020

(30) Foreign Application Priority Data

Oct. 6, 2016  (WO) .................. PCT/EP2016/073859

(51) Int. Cl.
*F02D 13/04* (2006.01)
*F02D 41/00* (2006.01)
(Continued)

(52) U.S. Cl.
CPC ................ *F02D 13/04* (2013.01); *F01L 1/08* (2013.01); *F01L 1/181* (2013.01); *F01L 13/065* (2013.01);
(Continued)

(58) Field of Classification Search
CPC ... F02D 13/04; F02D 9/02; F02D 9/06; F02D 41/0007; F02D 41/12; F02D 2009/0242; F02D 2200/101
(Continued)

(56) References Cited

U.S. PATENT DOCUMENTS

| 5,146,890 A | 9/1992 | Gobert et al. |
| 7,523,736 B2 * | 4/2009 | Rammer .................. F02D 9/06 60/602 |

(Continued)

FOREIGN PATENT DOCUMENTS

| CN | 1225709 A | 8/1999 |
| CN | 101037955 A | 9/2007 |

(Continued)

OTHER PUBLICATIONS

International Search Report (dated Jan. 12, 2017) for corresponding International App. PCT/EP2017/066344.

(Continued)

*Primary Examiner* — Logan M Kraft
*Assistant Examiner* — John D Bailey
(74) *Attorney, Agent, or Firm* — Venable LLP; Jeffri A. Kaminski

(57) ABSTRACT

A method of controlling an internal combustion engine in a vehicle that includes a cylinder, a fuel system for supplying fuel to the cylinder, an air guide arranged to guide an air flow to the cylinder, and an exhaust guide arranged to guide a gas flow from the cylinder, the method including controlling the engine to provide a braking torque, the control including terminating the supply of fuel to the cylinder, restricting the flow through the exhaust guide, and restricting the flow through the air guide. The control of the engine to provide a braking torque also includes determining a value of a rotational speed of a turbocharger of the engine, and adjust- (Continued)

ing, in dependence on the determined turbocharger rotational speed value, the restriction of the flow through the air guide, and/or the restriction of the flow through the exhaust guide.

10 Claims, 8 Drawing Sheets

(51) Int. Cl.
    *F02D 41/12*     (2006.01)
    *F02D 9/06*     (2006.01)
    *F02D 9/02*     (2006.01)
    *F01L 1/08*     (2006.01)
    *F01L 1/18*     (2006.01)
    *F01L 13/06*     (2006.01)
    *F02D 13/02*     (2006.01)
    *F01N 13/10*     (2010.01)
    *F01L 1/34*     (2006.01)

(52) U.S. Cl.
    CPC ............... *F02D 9/02* (2013.01); *F02D 9/06* (2013.01); *F02D 13/0249* (2013.01); *F02D 41/0007* (2013.01); *F02D 41/12* (2013.01); *F01L 1/34* (2013.01); *F01L 2305/00* (2020.05); *F01L 2800/00* (2013.01); *F01N 13/107* (2013.01); *F01N 2240/36* (2013.01); *F01N 2590/08* (2013.01); *F02D 2009/0242* (2013.01); *F02D 2200/101* (2013.01); *F02D 2700/04* (2013.01)

(58) Field of Classification Search
    USPC ........................................................ 123/323
    See application file for complete search history.

(56) References Cited

U.S. PATENT DOCUMENTS

| | | | | |
|---|---|---|---|---|
| 7,900,597 | B2* | 3/2011 | Meneely | F02D 9/06 123/90.12 |
| 8,109,091 | B2* | 2/2012 | Xiao | F02M 26/10 123/568.21 |
| 10,393,038 | B2* | 8/2019 | Wang | F02B 37/12 |
| 2003/0145591 | A1* | 8/2003 | Arnold | F02B 37/24 60/602 |
| 2003/0178002 | A1* | 9/2003 | Israel | F02D 13/04 123/568.21 |
| 2003/0234378 | A1* | 12/2003 | Hartley | F16K 1/165 251/307 |
| 2006/0060166 | A1* | 3/2006 | Huang | F02D 9/06 123/321 |
| 2009/0187331 | A1* | 7/2009 | Olsson | F02D 9/06 701/112 |
| 2010/0024767 | A1* | 2/2010 | Meneely | F02D 13/04 123/323 |
| 2010/0037855 | A1* | 2/2010 | French | F02B 37/00 123/323 |
| 2010/0037856 | A1* | 2/2010 | Dickerson | F02B 37/02 60/602 |
| 2010/0101531 | A1* | 4/2010 | Carlstrom | F02B 37/18 60/602 |
| 2010/0258080 | A1* | 10/2010 | Andrasko | F02B 37/24 60/602 |
| 2011/0036088 | A1* | 2/2011 | Xin | F02D 13/04 123/320 |
| 2011/0100324 | A1* | 5/2011 | Xin | F02D 13/04 123/322 |
| 2012/0017869 | A1* | 1/2012 | Rammer | F02D 13/04 123/323 |
| 2013/0074495 | A1* | 3/2013 | Chi | F02D 41/1448 60/605.2 |
| 2013/0206103 | A1* | 8/2013 | Palumbo | F02D 9/06 123/323 |
| 2013/0213350 | A1* | 8/2013 | Watanabe | F02B 39/10 123/327 |
| 2013/0317727 | A1* | 11/2013 | Kowalkowski | F02D 41/123 701/112 |
| 2014/0214308 | A1* | 7/2014 | Mulloy | F02D 13/04 701/110 |
| 2015/0047601 | A1* | 2/2015 | Hellemann | F02D 9/02 123/323 |
| 2015/0144097 | A1* | 5/2015 | Lingens | F02D 41/263 60/605.1 |
| 2016/0169127 | A1* | 6/2016 | Rammer | F02B 37/02 123/90.15 |
| 2018/0363567 | A1* | 12/2018 | Mohlin | F02B 37/22 |
| 2019/0085758 | A1* | 3/2019 | Kurtz | F02D 41/005 |
| 2019/0085759 | A1* | 3/2019 | Kurtz | F02D 41/0005 |

FOREIGN PATENT DOCUMENTS

| | | |
|---|---|---|
| CN | 101696645 A | 4/2010 |
| CN | 103174470 A | 6/2013 |
| CN | 105275622 A | 1/2016 |
| EP | 1336740 A2 | 8/2003 |
| JP | 2005307898 A | 11/2005 |
| JP | 2010001822 A | 1/2010 |
| JP | 2010024967 A | 2/2010 |
| WO | 2006122570 A1 | 11/2006 |
| WO | 2008008005 A1 | 1/2008 |
| WO | 2013159988 A1 | 10/2013 |

OTHER PUBLICATIONS

China Office Action dated Jun. 3, 2021 in corresponding China Patent Application No. 201780061199.0, 22 pages.

* cited by examiner

INTERNAL COMBUSTION ENGINE AND A METHOD FOR CONTROLLING A BRAKING TORQUE OF THE ENGINE

BACKGROUND AND SUMMARY

The invention relates to a method for controlling an internal combustion engine, a computer program, a computer readable medium, and a control unit.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as a car.

It may be desirable to provide, in particular in heavy-duty vehicles, a powerful engine braking function, e.g. in long downhill road stretches with heavy loads. U.S. Pat. No. 5,146,890A describes an engine with a throttling device in the exhaust system so as to increase the back-pressure therein. U.S. Pat. No. 5,146,890A also describes the provision of exhaust valve opening sequences at the beginning and the end of the compression stroke so as to provide a pressure charge in the cylinder and to avoid a push-back effect at the end of the compression stroke, respectively.

However, during the engine braking operation, there may be changes in the circumstances which reduce the braking power, or which entail risks of damaging the engine due to design limits being exceeded. Although the solution in U.S. Pat. No. 5,146,890A provides an advantageous increment of the engine braking power, design limits require relatively large margins for the braking operation which impede maximization of the braking power.

US2012017869A1 describes a system with a throttle in the exhaust system. The back-pressure causes an intermediate opening of the cylinder outlet valves and a rocker arm mechanism keeps the valve open until the exhaust valve main opening sequence occurs. This is disadvantageous since the exhaust valves are open during the entire compression stroke, whereby engine braking power is lost. Also, there is similarly to the solution in U.S. Pat. No. 5,146,890A disadvantageous need to consider design limits which require relatively large margins for the braking operation which impede maximization of the braking power.

US20160169127 describes a decompression brake, which influences outlet valves and is dependent on the exhaust gas backpressure, and a brake flap, which is arranged in the exhaust system. The demanded braking torque is controlled in accordance with the boost pressure of a turbocharger and with the exhaust gas backpressure upstream of the brake flap, which is, arranged directly upstream of an exhaust turbine of the exhaust turbocharger. The engine braking torque is controlled by a level of closure of the brake flap. However, a very small change of the braking flap position may result in a major change of the engine braking torque, making it difficult to achieve during part load engine braking a good drivability of a vehicle in which the engine is provided.

US2014214308A1 discloses closing m air intake throttle, and decreasing the swallowing capacity of a variable geometry turbocharger in response to an operation of a compression brake.

WO2008008005A1 suggests activating an exhaust brake by selecting, adapting or controlling the boost pressure, the pre- or after turbine pressure, the turbine speed, or a variable turbine geometry.

W)2013159788A1 discloses regulating the air flow through an exhaust pressure governor by a closed loop control using the pressure downstream of the cylinders.

US2016169127A1 discloses controlling a demanded braking torque in accordance with the boost pressure of a turbocharger, and with the exhaust gas backpressure upstream of a brake flap, which is arranged directly upstream of an exhaust turbine of the turbocharger.

It is desirable to increase the braking performance of internal combustion engines in vehicles. It is also desirable to improve the control of an internal combustion engine braking torque.

In accordance with an aspect of the invention, a method is provided of controlling an internal combustion engine in a vehicle comprising a cylinder, a fuel system for supplying fuel to the cylinder, an air guide arranged to guide an air flow to the cylinder, an exhaust guide arranged to guide a gas flow from the cylinder, the method comprising controlling the engine to provide a braking torque, the control comprising, terminating the supply of fuel to the cylinder, restricting the flow through the exhaust guide, and restricting the flow through the air guide, the control of the engine to provide a braking torque also comprising determining a value of a rotational speed of a turbocharger of the engine, and adjusting, in dependence on the determined turbocharger rotational speed value, the restriction of the flow through the air guide, and/or the restriction of the flow through the exhaust guide.

The method may be advantageously performed in a four stroke internal combustion engine. It is understood that the method may include control of the engine braking torque to a drivetrain of the vehicle. The turbocharger may comprise a turbine, the exhaust guide being arranged to guide the gas flow from the cylinder to the turbine. It is understood that restricting the flow through the exhaust guide may comprise adjusting an adjustable exhaust flow restriction element arranged to restrict the flow through the exhaust guide. It is also understood that restricting the flow through the air guide may comprise adjusting an adjustable air flow restriction element arranged to restrict the flow through the air guide.

The combination of the restriction of the flow through the exhaust guide, and the adjustment of the restriction of the flow through the air guide in dependence on the determined the turbocharger rotational speed value, provides for a control of partial braking torques with a high precision. This allows a good driveability of a vehicle in which the engine is provided. The air guide presents a lower temperature and less pressure fluctuations than the exhaust guide. Also, differing from the exhaust flow restriction, the air flow restriction does not affect the cylinder pressure to any substantial degree. As a result, compared to controlling the exhaust flow, controlling the flow restriction in the air guide will result in a reduced risk of an overreaction of the braking torque to relatively small flow changes.

Adjusting the restriction of the flow through the air guide in dependence on the turbocharger rotational speed value, provides a significant advantage. At relatively high rotational speeds of the engine in an engine braking operation, e.g. 1800-2300 rpm in a heavy duty truck diesel engine, a limit of the rotational speed of the turbocharger may be reached before limits of other operational parameters are reached. Therefore, the turbocharger rotational speed limit may effectively provide a limit of the engine braking performance. Adjusting the restriction of the flow through the air guide in dependence on the turbocharger rotational speed value, provides an engine braking control in direct dependence on the parameter which sets the limit to the performance. This allows for controlling the engine braking so as to be very close to the performance limit. Although the pressure in the air guide, downstream of a compressor of the turbocharger may be indicative of the turbocharger rotational speed, the air guide pressure is dependent also on other parameters. Therefore, it is usually not possible to use the air guide pressure as an indicator of the turbocharger rotational speed with any high degree of accuracy. As a consequence, adjusting the restriction of the flow through the air guide in dependence on the air guide pressure, requires a safety margin to secure that the turbocharger rotational speed limit is not exceeded. As opposed to this, the invention allows for an operation without such a limit, and therefore, the engine braking performance can be increased.

Further the invention allows for avoiding undesired rotational speeds of the turbocharger. An undesired rotational speed of the turbocharger may for example be a rotational speed that may cause High Cycle Fatigue (HCF) of turbine blades of the turbocharger. HDF may in some turbochargers occur at a certain combination of the turbocharger rotational speed and the pressure difference across the turbocharger. The method may thus comprise determining the pressure upstream and/or downstream of the turbocharger turbine. The method may further comprise adjusting, in dependence on the determined turbocharger rotational speed value, and in dependence on the pressure upstream and/or downstream of the turbocharger turbine, the restriction of the flow through the air guide, and/or the restriction of the flow through the exhaust guide. Thereby, the restriction of the flow through the air guide, and/or the restriction of the flow through the exhaust guide, may be adjusted so as to avoid HCF of the turbine blades of the turbocharger. In other words, the rotational speed to the turbocharger may be controlled so as to avoid a rotational speed at which there is a risk of HCF of the turbine blades of the turbocharger. More generally, restriction of the flow through the air guide, and/or the restriction of the flow through the exhaust guide, may be adjusted so as to avoid an undesired rotational speed of the turbocharger. It should be noted that such an undesired rotational speed may be below a maximum limit of the rotational speed of the turbocharger.

Preferably, the turbocharger rotational speed value is determined by means of a turbocharger rotational speed sensor.

It is understood that the engine preferably comprises an exhaust valve arranged to control a communication between the cylinder and the exhaust guide. Preferably, the method comprises performing in each of a plurality of cycles of the cylinder an exhaust valve actuation sequence.

Preferably, adjusting the restriction of the flow through the air guide comprises adjusting a throttle valve in the air guide. Thereby a simple and effective way of obtaining a high precision partial engine brake torque may be provided.

Preferably, where the restriction of the flow through the air guide is adjusted in dependence on the determined turbocharger rotational speed value, the adjustment of the restriction of the flow through the air guide is a closed loop adjustment. As exemplified below, the exhaust flow restriction may be adapted in an open loop control algorithm to provide a backpressure for the engine to provide a braking torque, and the air flow restriction may be adjusted in a closed loop to provide a high precision control of the braking torque at partial load.

Preferably, the turbocharger rotational speed is a feedback parameter in the closed loop adjustment. Providing the closed loop adjustment with the turbocharger rotational speed as a feedback adjustment provides particularly good possibilities of controlling the engine braking so as to be very close to the performance limit, mentioned above.

A desired value of the turbocharger rotational speed may be determined based on one or more of the engine rotational speed, a requested engine braking torque, and a current engine braking torque. Thereby, the closed loop adjustment may be beneficially adapted to the operational circumstances as represented by the engine rotational speed, the requested engine braking torque, and/or the current engine braking torque.

The method may comprise adjusting the restriction of the flow through the exhaust guide in dependence on one or more of the engine rotational speed, a requested engine braking torque, and a current engine braking torque. The adjustment of the restriction of the flow through the exhaust guide is advantageously done in an open loop adjustment. Thereby, an algorithm, which is simple to implement, is provided to obtain an exhaust guide back pressure and a coarse setting of the engine brake power level, and a continuous closed loop adjustment, in dependence on the turbocharger rotational speed value, of the restriction of the flow through the air guide may fine tune the cylinder air mass-flow and the cylinder pressure, to closely adjust the engine braking power.

The exhaust guide may be arranged to guide the gas flow from the cylinder to a turbine of the turbocharger, wherein the adjustable exhaust flow restriction element is arranged between the cylinder and the turbine. Restricting the flow through the exhaust guide may comprise adjusting a throttle valve in the exhaust guide. Alternatively, or in addition, restricting the flow through the exhaust guide may comprise adjusting a flow adjustment function at the turbocharger turbine, where the turbocharger is a variable geometry turbocharger.

According to another aspect of the invention, a method is provided of controlling an internal combustion engine in a vehicle comprising a cylinder, a fuel system for supplying fuel to the cylinder, an air guide arranged to guide an air flow to the cylinder, and an exhaust guide arranged to guide a gas flow from the cylinder, the method comprising
controlling the engine to provide a braking torque, the control comprising,
terminating the supply of fuel to the cylinder,
restricting the flow through the exhaust guide, and
restricting the flow through the air guide,
characterized in that the control of the engine to provide a braking torque also comprises
determining a value of an engine parameter affecting the pressure in the cylinder and/or the air mass flow through the cylinder, and
adjusting, in dependence on the determined engine parameter value, the restriction of the flow through the exhaust guide, wherein the adjustment of the restriction of the flow through the exhaust guide is a closed loop adjustment, wherein the determined engine parameter is a feedback parameter in the closed loop adjustment.

In particular at relatively low engine speeds, a significant advantage is provided with adjusting, in dependence on the determined engine parameter value, the restriction of the flow through the exhaust guide, wherein the adjustment of the restriction of the flow through the exhaust guide is a closed loop adjustment, wherein the determined engine parameter is a feedback parameter in the closed loop adjustment. Due to the relatively low mass flow at low engine speeds, it may be difficult to control the engine brake torque by adjusting the restriction of the flow through the air guide. For example, where the air guide flow restriction is effected by a throttle valve, such a valve may need to be moved to a position in which it is almost closed, before any noticeable control of the engine brake torque is obtained. However, the relatively low pressure levels in the exhaust guide at low engine speeds, may allow for an accurate closed loop control of the exhaust guide flow restriction. Thereby, the precision of the engine brake torque control may be improved at low engine speeds.

In some embodiments, the engine parameter may be one of, or a parameter which is dependent on one or more of, a rotational speed of a turbocharger of the engine, a pressure in the exhaust guide, and a pressure in the air guide. In some embodiments, the engine parameter may be a difference between a pressure in the air guide, and a pressure in the exhaust guide. By using any of these parameters for adjusting the exhaust guide flow restriction, an effective control of the air mass flow and the cylinder pressure may be provided.

Preferably, a desired value of the engine parameter is determined based on one or more of the engine rotational speed, a requested engine braking torque, and a current engine braking torque. Thereby, the closed loop adjustment may be beneficially adapted to the operational circumstances as represented by the engine rotational speed, the requested engine braking torque, and/or the current engine braking torque.

Preferably, the method comprises adjusting the restriction of the flow through the air guide in dependence on one or more of the engine rotational speed, a requested engine braking torque, and a current engine braking torque. The adjustment of the restriction of the flow through the air guide is advantageously done in an open loop adjustment. Thereby, a simple algorithm is provided, in particular for relatively low engine speeds, to obtain, by the air guide flow restriction adjustment, a coarse setting of the engine brake power level, and a continuous closed loop adjustment of the exhaust guide flow restriction, for closely adjusting the engine braking power.

In advantageous embodiments, the method comprises determining the engine rotational speed, wherein the step of performing a closed loop adjustment of the restriction of the flow through the exhaust guide is omitted if the engine rotational speed is above a threshold value. Thereby, the method may comprise determining, if the engine rotational speed is above the threshold value, a value of an engine parameter affecting the pressure in the cylinder and/or the air mass flow through the cylinder, and adjusting, in dependence on the determined engine parameter value, the restriction of the flow through the air guide, wherein the adjustment of the restriction of the flow through the air guide is a closed loop adjustment, wherein the determined engine parameter is a feedback parameter in the closed loop adjustment. Further, if the engine rotational speed is above the threshold value, the restriction of the flow through the exhaust guide may be adjusted in dependence on one or more of the engine rotational speed, a requested engine braking torque, and a current engine braking torque.

Thereby, the method may provide a selection of one of two modes of the engine brake control, based on the engine speed. More specifically, the closed loop control of the exhaust guide flow restriction may be used where it may provide a more accurate engine brake torque control than the closed loop control of the air guide flow restriction, such as at relatively low engine speeds. The closed loop control of the air guide flow restriction may be used where it may provide a more accurate engine brake torque control than the closed loop control of the exhaust guide flow restriction, such as at relatively high engine speeds.

Where the engine comprises a turbocharger comprising a turbine, the exhaust guide being arranged to guide the gas flow from the cylinder to the turbine, restricting the flow through the exhaust guide may comprise adjusting an exhaust flow restriction element in the exhaust guide, the adjustable exhaust flow restriction element being arranged between the cylinder and the turbine. Compared to locating the exhaust flow restriction element downstream of the turbine, the upstream location will increase the turbo speed and air mass flow through the engine, whereby the engine braking power may be increased. The upstream exhaust flow restriction element creates a high back pressure in the exhaust manifold without reducing turbo performance. The upstream location of the exhaust flow restriction element allows the turbocharger to be effective within a larger engine speed range, which in turn increases the available engine speed range controllable by the exhaust flow restriction element.

The invention may be implemented in a variety of internal combustion engine types. Below are some examples of features of an engine in which the invention may be implemented.

As suggested, an adjustable air flow restriction element may be arranged to provide the restriction of the flow through the air guide. The air flow restriction element may comprise a throttle valve in the air guide. An adjustable exhaust flow restriction element may be arranged to provide the restriction of the flow through the exhaust guide. The exhaust flow restriction element may comprise a throttle valve in the exhaust guide.

The engine may comprise an exhaust valve, arranged to control a communication between the cylinder and the exhaust guide, and an exhaust valve actuation assembly for actuating the exhaust valve so as to perform in each of a plurality of cycles of the cylinder an exhaust valve actuation sequence. The exhaust valve actuation assembly may be adapted to control the commencement of the exhaust valve actuation sequence to occur selectively at any crankshaft angle within a non-zero crankshaft angle interval.

The exhaust flow restriction element, the exhaust valve, and the exhaust valve actuation assembly may be adapted to provide a backpressure for the engine to provide a braking torque, and the air flow restriction element may be adapted to enable controllability of said braking torque. Thereby, the exhaust flow restriction element, the exhaust valve and the exhaust valve actuation assembly may allow a high maximum braking torque at a wide engine speed interval, while the air flow restriction element allows a high degree of control of the braking torque at a partial load operation.

Where the turbocharger comprises a compressor, and the air guide is arranged to guide the air flow from the compressor to the cylinder, the adjustable air flow restriction element may be arranged between the compressor and the cylinder. However, where the air guide is arranged to guide the air flow to the compressor, the adjustable air flow restriction element may alternatively be arranged upstream of the compressor.

The air flow restriction element may be arranged to provide a plurality of levels of the air flow restriction depending on the adjustment of the air flow restriction element. The air flow restriction element may be adapted to provide the restriction of the air flow restriction element at any level within a non-zero restriction interval.

The engine may be adapted to run with a Diesel cycle, or adapted to run with an Otto cycle. The engine may have one or more cylinders. It is understood that in some embodiments with a multi cylinder engine, a single air guide may be arranged to guide air to all cylinders of the engine, wherein a single air flow restriction element is provided to adjustably provide a restriction of the air flow. However, in some embodiments, the engine may be provided with two air guides, each guiding an air flow to a respective cylinder, or a respective sub-group of cylinders, and each being provided with a respective air flow restriction element.

The crankshaft angle interval, within which the commencement of the exhaust valve actuation sequence may occur selectively at any crankshaft angle, may extend over 30-50 crankshaft angle degrees, e.g. 40 crankshaft angle degrees.

The exhaust valve actuation assembly may comprise a rotatable camshaft arrangement, the camshaft arrangement being adapted to provide the control of the commencement of the exhaust valve actuation sequence to occur selectively at any crankshaft angle within the non-zero crankshaft angle interval. Where the exhaust valve actuation assembly includes a rotatable camshaft, the exhaust valve actuation assembly may be controllable for adjusting the phase of the camshaft rotation in relation of the crankshaft rotation. The exhaust valve actuation assembly may comprise a variator for variable valve timing.

An alternative to cam phasing may be the use of two coaxial camshafts with a respective cam lobe profile which provide a combined cam lobe profile with an adjustable length. Thereby, one follower may span the pair of closely spaced cam lobes. By changing the duration of the valve lift by advancing one of the cam lobes in the camshaft rotation direction, an advancement of the commencement of the exhaust valve actuation sequence will also be obtained, and vice versa.

The engine may be a four-stroke internal combustion engine. The exhaust valve actuation sequence may be a decompression opening sequence of the exhaust valve commenced in a compression stroke of the respective cycle of the cylinder, the exhaust valve actuation assembly being controllable for selectively providing the decompression opening sequence. For this, the exhaust valve actuation assembly may comprise a camshaft presenting at least one cam lobe presenting a decompression nose for the decompress on opening sequence, the exhaust valve actuation assembly being controllable for selectively actuating the exhaust valve by means of the decompression nose. The decompression opening sequence of the exhaust valve may be commenced in a later half of the compression stroke. Thereby, the decompression opening sequence serves to avoid a push-back effect, which the compressed air would otherwise have produced at the end of the compression stroke.

The exhaust valve actuation sequence may be a charging opening sequence of the exhaust valve commenced in a second half of an intake stroke or a first half of a compression stroke of the cylinder, the exhaust valve actuation assembly being controllable for selectively providing the charging opening sequence. For this, the exhaust valve actuation assembly may comprise a camshaft presenting at least one cam lobe presenting a charging nose for the charging opening sequence, the exhaust valve actuation assembly being controllable for selectively actuating the exhaust valve by means of the charging nose. Thereby, when the piston is at its bottom dead centre, and the compression stroke is about to start, the exhaust valve opens for a short time period and the relatively higher pressure in the exhaust guide "charges" the cylinder. As a result of this, the braking effect on the piston during the compression stroke will be considerably higher than without the charge opening sequence.

Preferably, the exhaust flow restriction element is arranged to provide a plurality of levels of the exhaust flow restriction depending on the adjustment of the exhaust flow restriction element. Preferably, the exhaust flow restriction element is adapted to provide the restriction of the exhaust flow restriction element at any level within a no zero restriction interval.

As suggested, the turbocharger may comprise a turbine for extracting power from exhaust gases from the cylinder to drive a compressor for charging air to be guided to the cylinder. The exhaust guide may thus be arranged to guide the gas flow from the cylinder to the turbine, and the adjustable exhaust flow restriction element may be arranged between the cylinder and the turbine. Thus, the exhaust flow restriction element is preferably located upstream of the turbine to restrict the flow from the cylinder to the turbine. However, in some embodiments, the exhaust flow restriction element may be located downstream of the turbine to restrict the flow from the turbine.

In some embodiments, the engine may be provided with two exhaust guides, each guiding a gas flow from a respective cylinder, or a respective sub-group of cylinders, and each being provided with a respective exhaust flow restriction element. It is understood however that in some embodiments of a multi cylinder engine, a single exhaust guide may be arranged to guide a gas flow from all cylinders of the engine to a turbine of a turbocharger, wherein a single exhaust flow restriction element is provided to adjustably provide a restriction of the gas flow.

The turbocharger may be a fixed geometry turbocharger with a turbine in one, two or more steps. In some embodiments, the engine comprises a variable geometry turbocharger comprising a turbine, the exhaust guide being arranged to guide the gas flow from the cylinder to the turbine, wherein the turbocharger is arranged to provide at the turbine an adjustable restriction of the gas flow in addition the restriction which the adjustable exhaust flow restriction element is arranged to provide. In some embodiments, where the engine comprises a variable geometry turbocharger comprising a turbine, the exhaust guide is arranged to guide the gas flow from the cylinder to the turbine, the adjustable exhaust flow restriction element may be provided by a flow adjusting function at the turbine. Thereby, the exhaust flow restriction element may be integrated with the variable geometry turbocharger, which reduces the complexity of the engine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
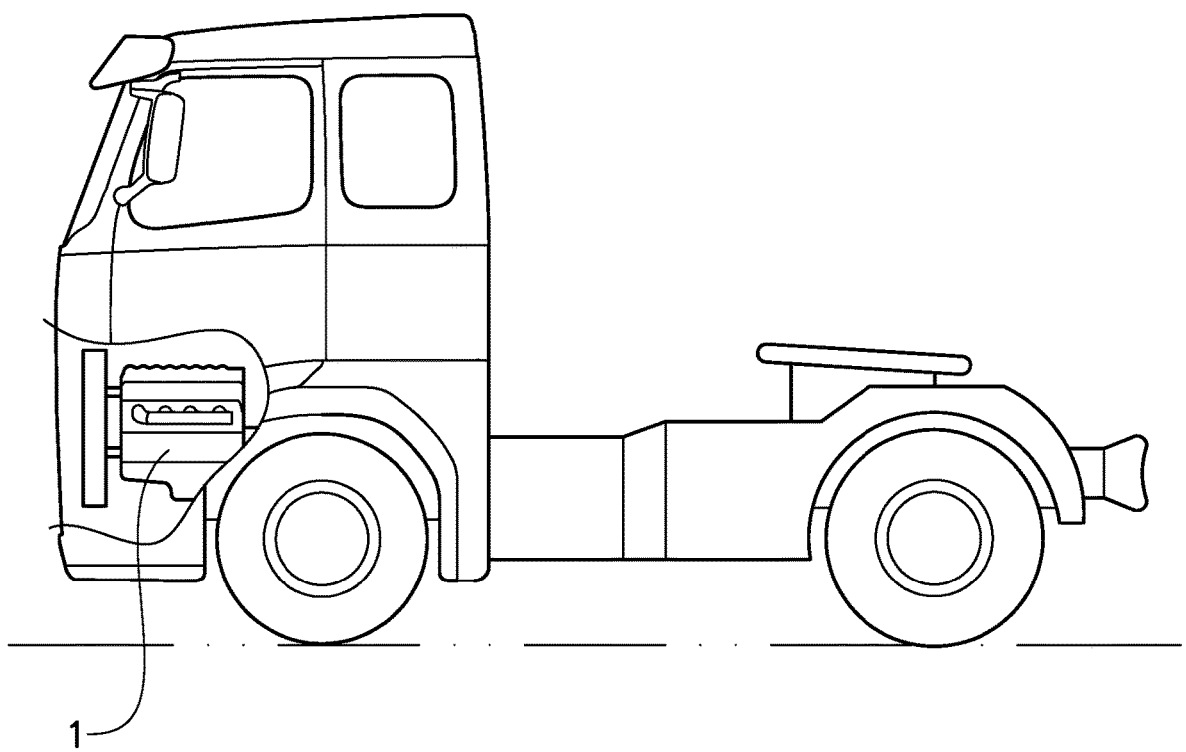
FIG. 1 is a side view of a vehicle in the form of a truck.

FIG. 1 shows a vehicle in the form of a truck, or a tractor for a semitrailer. It should be noted that the vehicle can be of a variety of alternative types, e.g, it may be a car, a bus, or a working machine such as a wheel loader. The vehicle comprises a four-stroke internal combustion engine 1.

Figure 2:
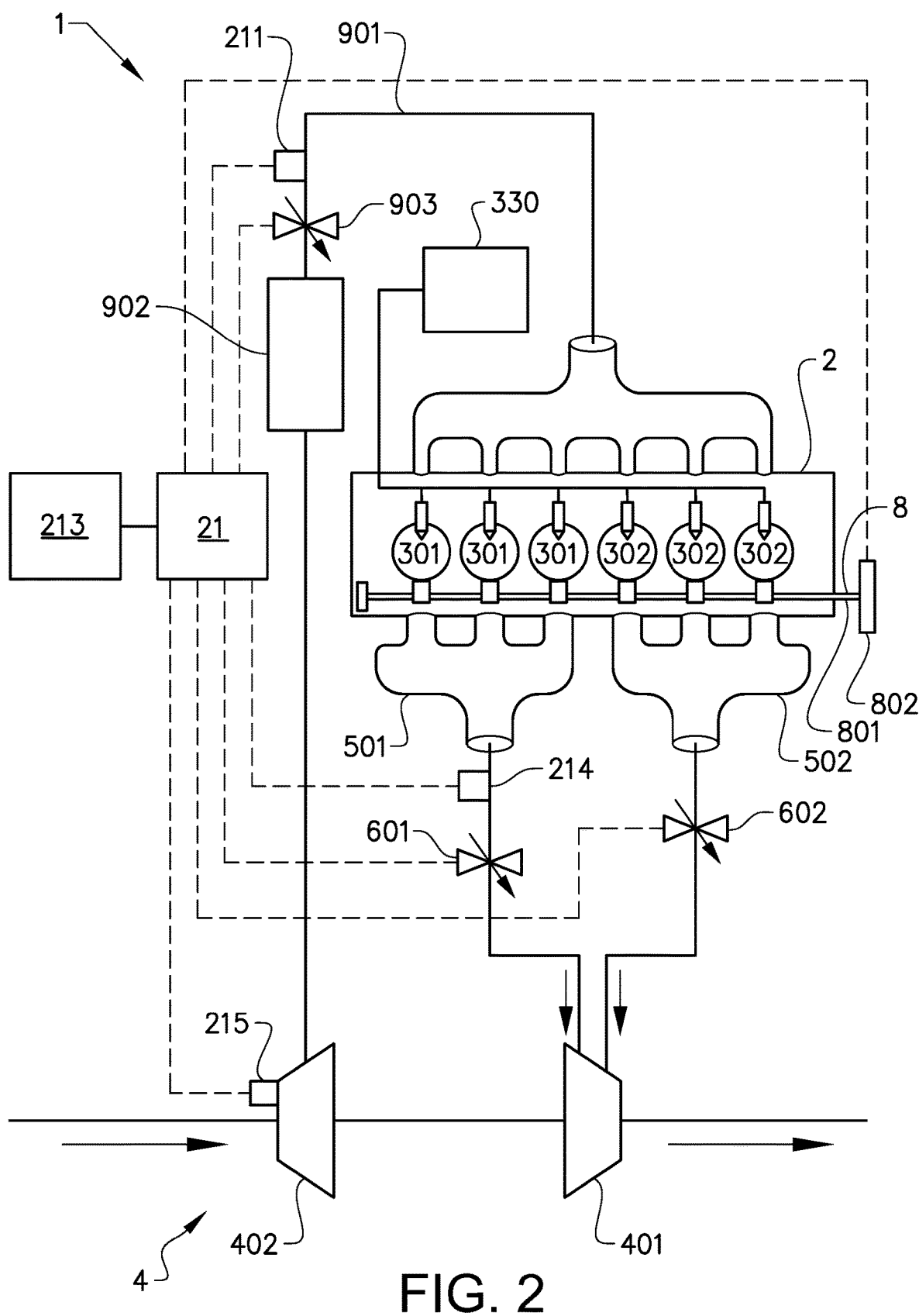
FIG. 2 is a schematic drawing of an internal combustion engine in the vehicle in FIG. 1.

As can be seen in FIG. 2, the engine in this example comprises six cylinders 301, 302 arranged in a line. The engine 1 is oriented in the vehicle such that line of cylinders is parallel with the direction of straight travel of the vehicle. It should be noted however that in alternative embodiments the orientation of the engine may have another orientation in the vehicle. For example it may be a transverse engine, i.e. an engine installed such that the crankshaft of the engine is perpendicular to the direction of straight travel of the vehicle. This may be the case e.g. in a bus, where the engine may be a transverse engine mounted in the rear of the bus. The cylinders include first cylinders 301 which are the three cylinders located forward in the vehicle direction of forward travel, and second cylinders 302 which are the three cylinders located rearward in the vehicle direction of forward travel.

The engine comprises a turbocharger 4 comprising a turbine 401 in an exhaust conduit arrangement 501, 502 of the engine. The turbocharger 4 also comprises a compressor 402 in an air guide 901 arranged to guide an air flow from the compressor 402 to the cylinders 301, 302 via a charge air cooler 902. The turbine 401 and the compressor 402 are fixedly connected and rotatable, whereby the turbine 401 is arranged to be driven by gases in the exhaust conduit arrangement 501, 502, to drive the compressor 402 which is arranged to compress air in the air guide 901, as in known per se.

The exhaust conduit arrangement comprises a first exhaust guide 501 arranged to guide a gas flow from the first cylinders 301 to the turbine 401, and a second exhaust guide 502 arranged to guide a gas flow from the second cylinders 302 to the turbine 401. Thereby, the flow from the second cylinders 302 to the turbine 401 is kept separate from the flow from the first cylinders 301 to the turbine.

A control unit 21 is arranged to determine values of engine parameters affecting the pressure in the cylinders and/or the air mass flow through the cylinders 301, 302. These parameters include a requested engine torque determined based on a requested vehicle speed provided from a vehicle speed control function, an actual vehicle speed, and the selected gear ratio of a transmission in the vehicle. The parameters also includes the engine rotational speed, which is determined by means of an engine speed sensor as described below. The engine parameters affecting the pressure in the cylinders and/or the air mass flow further include the pressure in the air guide 901, determined by means of signals from an air guide pressure sensor 211. Also, the control unit 21 is arranged to determine the turbocharger rotational speed by means of a turbocharger rotational speed sensor 215. Further, the control, unit 21 is arranged to determine the pressure in the exhaust guides 501, 502 based on signals from an exhaust guide pressure sensor 214 in the first exhaust guide 501. Alternatively, an additional exhaust guide pressure sensor may be provided in the second exhaust guide 502, or an exhaust guide pressure sensor may be provided in the second exhaust guide 502 only. Further, the control unit 21 is arranged to access a data storage unit 213 provided with data correlating values of the engine torque and the engine rotational speed with desired values of the turbocharger rotational speed or the pressure difference across the cylinders 301, 302.

An adjustable air flow restriction element, comprising a throttle valve in the air guide 901, is arranged to restrict the flow through the air guide 901. The adjustable air flow restriction element 903 is arranged between the compressor 402 and the cylinders 301, 302, more specifically, between the charge air cooler 902 and the cylinders 301, 302. The air guide pressure sensor 211 is located between the adjustable air flow restriction element 903 and the cylinders 301, 302. In alternative embodiments, the adjustable air flow restriction element 903 may be arranged upstream of the compressor 402.

The air flow restriction element 903 is controllable by the control unit 21 via an air flow restriction actuation assembly (not shown) comprising e.g. a stepper motor. In addition, a position sensor (not shown) at the air flow restriction element 903 is connected to the control unit 21, and arranged to register and send to the control unit signals representative of the position of the air restriction element 903, for a position feedback. It should be noted that any alternative type of air flow restriction actuation assembly may be provided; for example such as assembly may include a brushless motor or a pneumatic motor. The air flow restriction element 903 is adapted to provide the air restriction at any level within a non-zero restriction interval depending on the adjustment of the air flow restriction element 903.

A first adjustable exhaust flow restriction element 601 in the form of a first exhaust throttle valve is arranged in the first exhaust guide 501, between the first cylinders 301 and the turbine 401. The exhaust guide pressure sensor 214 is located between the first adjustable exhaust flow restriction element 601 and the cylinders 301. A second adjustable exhaust flow restriction element 602 in the form of a second exhaust throttle valve is arranged in the second exhaust guide 502, between the second cylinders 302 and the turbine 401. The first and second exhaust flow restriction elements are provided as "draw bridge" valves, which may be arranged to not provide any obstacle to the flow when fully open. Each valve 601, 602 may be provided in a unit which is boiled onto the respective exhaust guide 501, 502. It should be noted however, that in alternative embodiments, each valve may be integrated into the respective exhaust guide. In a further alternative, a valve may be integrated in housing of the turbine. As also mentioned elsewhere herein, a restriction element may be provided by the flow adjustment function of a variable geometry turbocharger. Each of the first and, second exhaust flow restriction elements 601, 602 are controllable by the control unit 21 via a respective exhaust flow restriction actuation assembly (not shown) comprising e.g. a stepper motor. In addition, a position sensor (not shown) at each exhaust flow restriction element 601, 602 is connected to the control unit 21, and arranged to register and send to the control unit signals representative of the position of the respective exhaust flow restriction element 601, 602, for a position feedback. It should be noted that any alternative type of exhaust flow restriction actuation assembly may be provided; for example such as assembly may include a brushless motor or a pneumatic motor.

Each of the first and second exhaust flow restriction elements 601, 602 is arranged to provide a plurality of levels of the exhaust flow restriction depending on the adjustment by the control unit 21 of the respective exhaust flow restriction element 601, 602. More specifically each exhaust flow restriction element 601, 602 is arranged to provide a continuous adjustment of the flow, i.e. to provide a flow restriction at any level within a non-zero restriction interval. The data storage unit 213 is provided with data correlating values of the engine torque and the engine rotational speed with settings for the first and second exhaust flow restriction elements 601, 602.

It should be noted that in alternative embodiments, a single exhaust guide may be arranged to guide exhaust gases from all cylinders of the engine. In some embodiments, a single exhaust flow restriction element 601 may be provided downstream of the turbine of the turbocharger. In further embodiments, the turbocharger 4 may be a variable geometry turbocharger, whereby the turbocharger 4 provides, with a flow adjusting function at the turbine 401, the function of the exhaust flow restriction element 601 as described herein.

At each of the cylinders 301, 302 two intake valves (not shown) are provided to control the admission of air from the air guide 901 to the respective cylinder 301, 302. Also, at each of the cylinders two exhaust valves, described closer below, are arranged to control a communication between the respective cylinder 301, 302 and the respective exhaust guide 501, 502. It should be rioted that in other embodiments only one or more than two exhaust valves may be provided at each cylinder.

Also, a fuel system 330 is provided to inject fuel into the cylinders during cycles thereof, and the fuel injection is controllable by the control unit 21. In this example, the fuel system comprises injectors arranged to inject fuel directly into the cylinders. Alternatives are however possible; e.g. the fuel system may have port injection.

The engine 1 comprises an exhaust valve actuation assembly 8 comprising a camshaft arrangement comprising a rotatable camshaft 801. At each cylinder 301, 302 a cam lobe 803 is fixed to the camshaft for actuation of the exhaust valves. The exhaust valve actuation assembly 8 also comprises a variator 802 for variable valve timing, more particularly for adjustment of the phase of the camshaft rotation.

Figure 3:
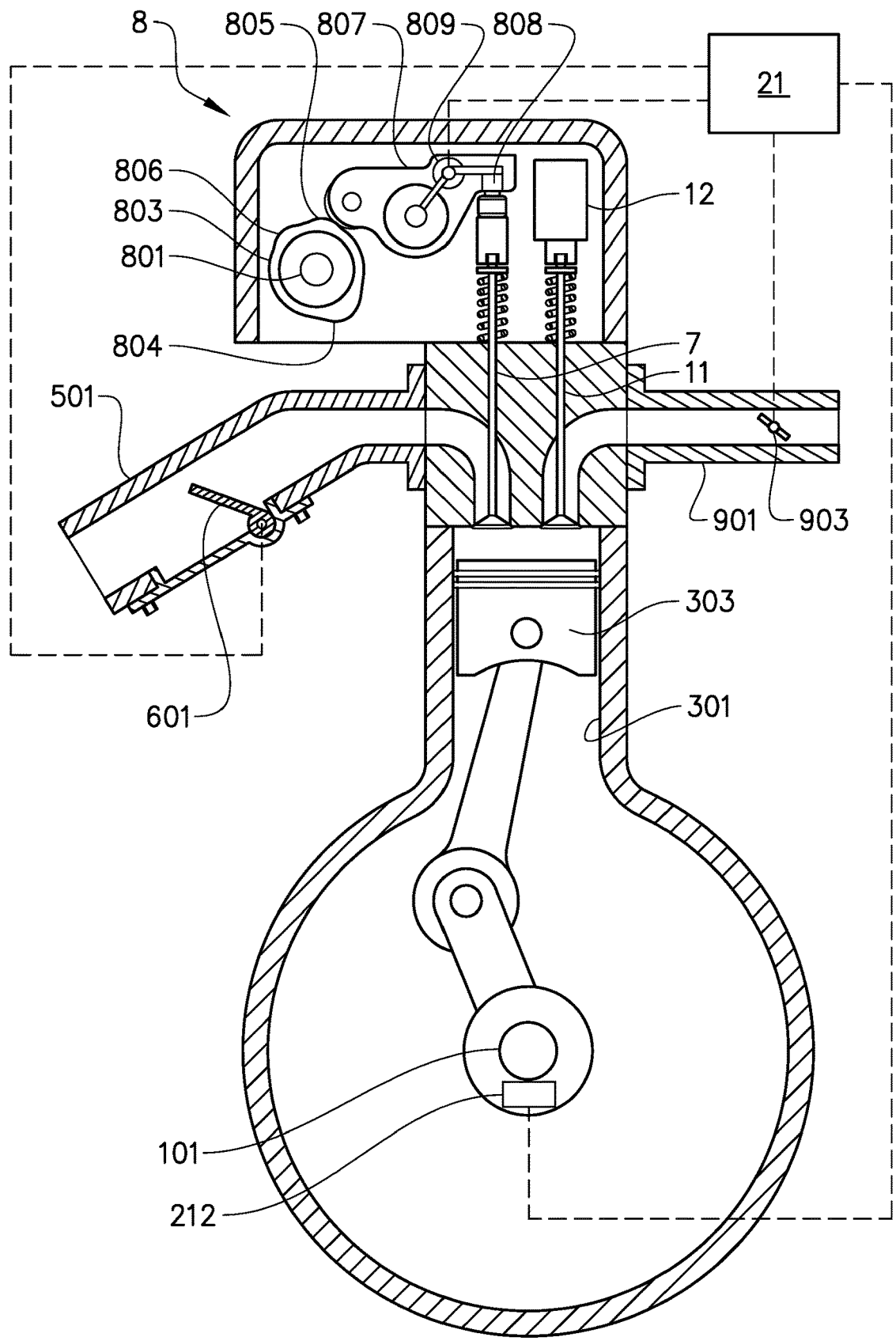
FIG. 3 is a view of a vertical cross-section at a cylinder of the engine in FIG. 2.

Reference is made also to FIG. 3 showing a cross-section through one of the first cylinders 301. Each cylinder 301, 302 comprises a piston 303 connected to a rotatable crankshaft 101. The control unit 21 is arranged to determine the engine speed by means of signals from an engine speed sensor 212 at the crankshaft 101. In alternative embodiments, a sensor may be arranged to detect the speed of the camshaft 801, whereby the crankshaft speed may be obtained by doubling the sensed camshaft speed. FIG. 3 also shows one of the exhaust valves 7 arranged to control the communication between the first cylinder 301 and the first exhaust guide 501. FIG. 3 further shows the first adjustable exhaust flow restriction element 601 in the first exhaust guide 501. In addition, one of the intake valves 11, arranged to control the communication between the first cylinder 301 and the air guide 901, is shown. For actuation of intake valves the engine 1 comprises an intake valve actuation assembly 12 which may comprise a camshaft arrangement with a rotatable camshaft (not show). FIG. 3 also shows the adjustable air flow restriction element 903 in the air guide 901.

The exhaust valve actuation assembly 8 comprises for each cylinder 301, 302 a rocker arm 807 arranged to pivot by contact at one end with the respective cam lobe 803 to actuate the exhaust valves 7. The cam lobe 803 presents a relatively large main nose 804, and two relatively small noses, i.e. a decompression nose 805 and a charge nose 806.

When the engine propels the vehicle, a distance is provided between on one hand the rocker arm 807 and on the other hand the decompression nose 805 and the charge nose 806. Therefore, the decompression nose 805 and the charge nose 806 do not provide any exhaust valve actuation when the engine propels the vehicle. However, during engine braking, the rocker arm 807 is in contact with the decompression nose 805 and the charge nose 806, which provide exhaust valve actuation sequences as described below.

The selective engagement of the decompression nose 805 and the charge nose 806 is provided by a hydraulic piston 808 at an end of the rocker arm 807 opposite to the end at which the rocker arm 807 is in contact with the cam lobe 803. The hydraulic piston 808 is controlled by a hydraulic conduit system and a control valve 809 in each rocker arm 807, each control valve 809 being controllable by the control unit 21.

Figure 4:
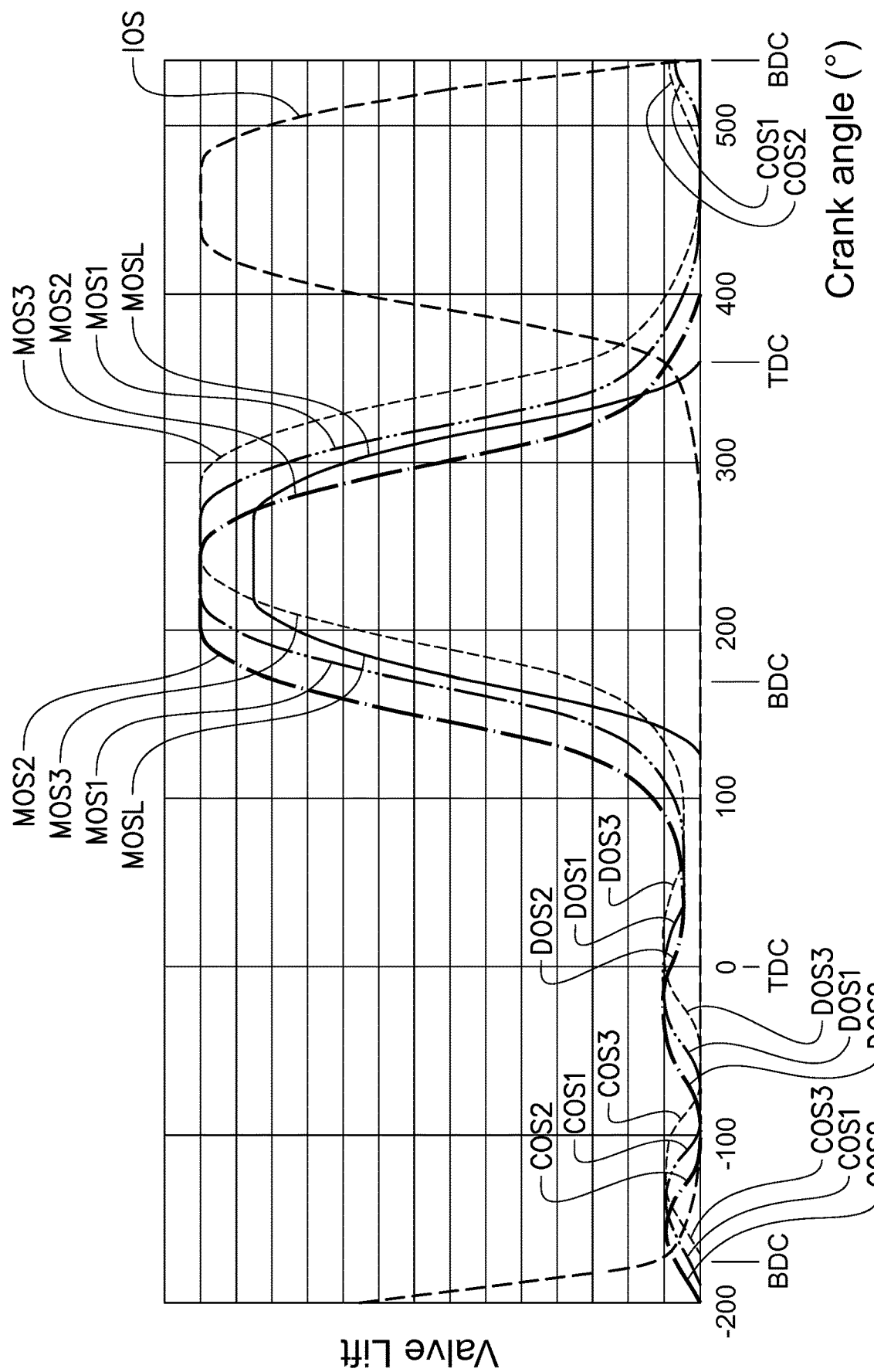
FIG. 4 is a diagram of actuation sequences of exhaust valves shown in FIG. 3 as functions of the crankshaft angle.

Reference is made also to FIG. 4 showing a diagram of actuation sequences of the exhaust valves shown in FIG. 3 as functions of the crankshaft angle. At each cylinder 301, 302 the main nose 804 of the cam lobe 803 is arranged to actuate the exhaust valves 7 so as to perform in each of a plurality of cycles of the respective cylinder 301, 302 an exhaust valve actuation sequence in the form of a main opening sequence MOSL. The main opening sequence MOSL, which during operations in which the engine propels the vehicle serves to expel exhaust gases from the cylinder, commences in an expansion stroke, and presents, a maximum degree of opening of the exhaust valves 7 in an exhaust stroke of the cylinder 301, 302. When the engine propels the vehicle, the rocker arm avoids contact with the decompression nose 805 and the charge nose 806 of the cam lobe as described above.

FIG. 4 also shows an intake valve opening sequence IOS performed by the intake valves at the cylinder.

When engine braking is commenced, the rocker arm is brought into contact with the decompression nose 805 and the charge nose 806 by control of the hydraulic piston 808 of the rocker arm 807 described above. As a result the lift by the main nose is also increased somewhat so that the main opening sequence appears as indicated by the curve MOS1 in FIG. 4.

In addition, the decompression nose 805 provides a decompression opening sequence DOS1, which is commenced in a compression stroke of the cylinder 301. The decompression opening sequence DOS1 serves to release the air compressed during the compression stroke. Thereby, the decompression opening sequence DOS1 serves to avoid a push-back effect, which the compressed air would otherwise, have produced at the end of the compression stroke.

Further during engine braking, the charge nose 806 provides a charge opening sequence COS1, which is commenced in a second half of an intake stroke of the cylinder 301. Thereby, when the piston 303 is at its bottom dead centre and the compression stroke is about to start, the exhaust valves 7 open for a short period and the relatively higher pressure in the exhaust guide 501 "charges" the cylinder. As a result of this, the braking effect on the piston 303 during the compression stroke will be considerably higher than without the charge opening sequence COS1. It should be noted that the exhaust valves 7 are fully closed between the charging opening, sequence COS1 and the decompression opening sequence DOS1. In alternative embodiments the degree of opening of the exhaust valves 7 may be merely reduced, without involving a complete closure of the exhaust valves, between the charging opening sequence COS1 and decompression opening sequence DOS1.

It should be noted that in alternative embodiments the charge nose 806 and the decompression nose 805 may be provided on a separate cam lobe adjacent to a cam lobe provided with the main nose 804. Thereby, the rocker arm may be provided in two parts, each following a respective of the cam lobes, although only the part following the cam lobe with the main nose is arranged to actuate the exhaust valves by default. The rocker arm parts may be provided with an engagement mechanism for selectively fixing the rocker arm parts to each other when the charge nose 806 and the decompression nose 805 are to provide the corresponding actuation sequences of the exhaust valves 7. In such embodiments, the lift by the main nose 804 may remain unchanged regardless of the engagements of the charge nose 806 and the decompression nose 805.

By means of said variator 802 (FIG. 2) and the possibility to adjust the phase of the camshaft rotation, the commencement of the exhaust valve actuation sequences MOS1, DOS1, COS1 may be controlled to occur selectively at any crankshaft angle within a non-zero crankshaft angle interval. In fact the entire exhaust valve actuation sequences MOS1, DOS1, COS1 may be moved within the non-zero crankshaft angle interval. Said interval may extend over e.g. 40 crankshaft angle degrees. Other interval sizes are however of course possible. The data storage unit 213 is provided with data correlating values of the engine torque and the engine rotational speed with settings for the phase of the camshaft rotation.

FIG. 4 shows examples of adjusted crankshaft values obtained by the camshaft phase adjustments. By moving the camshaft phase in the direction of rotation of the camshaft 801, the exhaust valve actuation sequences are moved forward in the cycles as indicated by the curves MOS2, DOS2, COS2 in FIG. 4. By moving the camshaft phase opposite to the direction of rotation of the camshaft 801, the exhaust valve actuation sequences are moved backwards in the cycles as indicated by the curves MOS3, DOS3, COS3 in FIG. 4. It should be noted that, apart from the crankshaft angle at which the respective exhaust valve actuation sequence is commenced, the exhaust valve actuation sequences are identical in all cycles.

Figure 5:
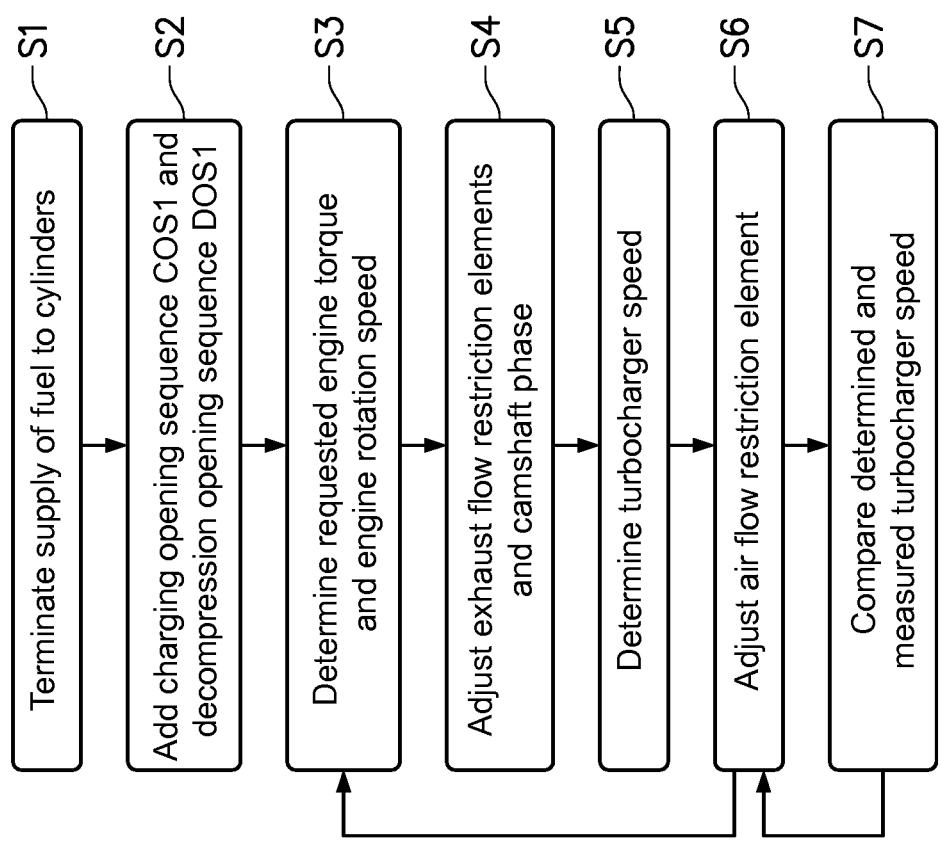
FIG. 5 is a block diagram depicting steps in a method of controlling the engine in FIG. 2.

With reference to FIG. 5 a method of controlling the engine 1 to provide a braking torque will be described.

When the engine braking is commenced, the supply of fuel to the cylinders 301, 302 is terminated S1.

The control valves 809 in the rocker arms 807 at the cylinders 301, 302 are controlled to actuate the hydraulic pistons 806 to engage the rocker arms 807 with the decompression noses 805 and the charge noses 806. Thereby the charging opening sequence COS1 and the decompression opening sequence DOS1 are added S2 to the cycles in the cylinders as described above.

The method also comprises determining S3 the requested engine torque and the engine rotational speed. The control unit 21 determines by means of the data in the data storage unit 213 a setting for the first and second exhaust flow restriction elements 601, 602 based on the determined values of the engine torque and the engine rotational speed. The exhaust flow restriction elements 601, 602 are adjusted S4 to the determined setting, so as to provide a restriction of the air flows in the exhaust guides 501, 502 correlated with the determined requested engine torque and engine rotational speed. This adjustment is an open loop adjustment, i.e. although it is updated based on changes in the requested engine torque and engine rotational speed, it is not updated with feedback from any parameter from which the air flow through the cylinders or the cylinder pressure may be determined.

The control unit 21 also determines, based on the requested engine torque and the engine rotational speed, by means of the data in the data storage unit 213, a setting for the camshaft phase. In an open loop control, the control unit 21 sends signals to the variator 802 so as to adjust S4 the phase of the camshaft rotation to adjust the crankshaft angles of the exhaust valve actuation sequences MOS1, DOS1, COS1. Retarding the commencement of the exhaust valve actuation sequences MOS1, DOS1, COS1 will reduce the pressure in the air guide 901 which will reduce the braking torque, and vice versa.

Based on the determined requested engine torque and engine rotational speed, the control unit 21 determines S5 based on the data in the storage unit 213 a desired turbocharger rotational speed value. In a closed loop control, the control unit 21 sends signals to the air flow restriction element 903 in the air guide 901 so as to adjust S6 the air flow restriction element 903, based on the desired turbocharger speed value and feedback signals from the turbocharger speed sensor 215. In the closed loop control, the feedback signals from the turbocharger speed sensor 215 are compared 57 to the desired turbocharger speed value. Moving the air flow restriction element 903 towards a fully closed position will reduce the pressure in the air guide 901 and hence the turbocharger speed, and vice versa.

Figure 6:
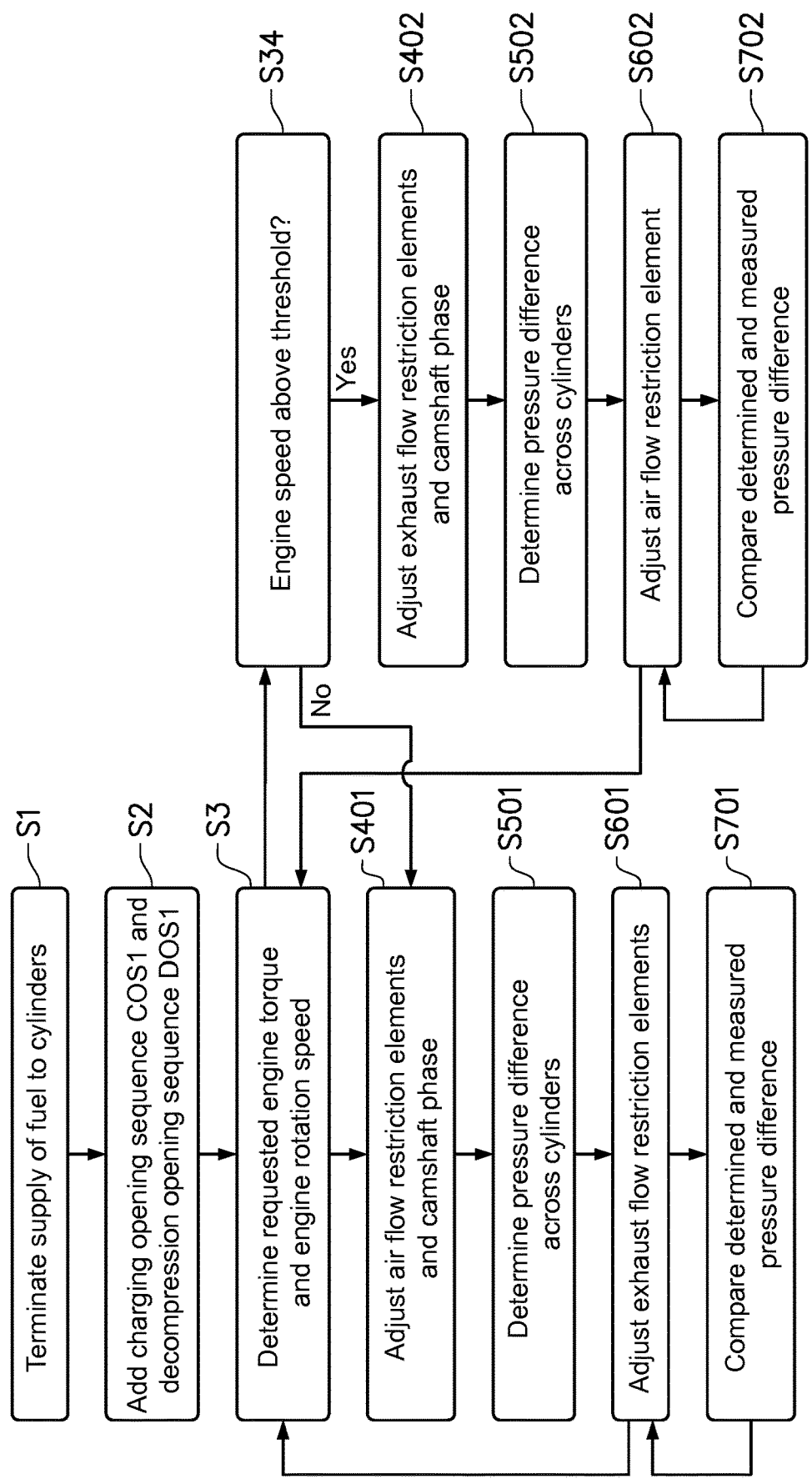
FIG. 6 is a block diagram depicting steps in a method of controlling the engine in FIG. 2, according to an alternative embodiment of the invention.

With reference is made to FIG. 6, an alternative embodiment of the method will be described.

As in the method described with reference to FIG. 5, when the engine braking is commenced, the supply of fuel to the cylinders 301, 302 is terminated S1, and the charging opening sequence COS1 and the decompression opening sequence DOS1 are added S2 to the cycles in the cylinders. Also, as in the method described with reference to FIG. 5, the method comprises determining S3 the requested engine torque and the engine rotational speed.

The method comprises determining S34 whether the engine speed is above a predetermined threshold value. If the engine speed is below the threshold value, the following steps are performed:

The control unit 21 determines by means of the data in the data storage unit 213 a setting for the air flow restriction element 903 in the air guide 901 based on the determined vales of the engine torque and the engine rotational speed. The air flow restriction element 903 is adjusted S401 to the determined setting, so as to provide a restriction of the air flow in the air guide 901 correlated with the determined requested engine torque and engine rotational speed. This adjustment is an open loop adjustment, i.e. although it is updated based on changes in the requested engine torque and engine rotational speed, it is not updated with feedback from any parameter from which the air flow through the cylinders or the cylinder pressure may be determined.

The control unit 21 also determines, based on the requested engine torque and the engine rotational speed, by means of the data in the data storage unit 213, a setting for the camshaft phase. In an open loop control, the control unit 21 sends signals to the variator 802 so as to adjust S401 the phase of the camshaft rotation to adjust the crankshaft angles of the exhaust valve actuation sequences MOS1, DOS1, COS1.

Based on the determined requested engine torque and engine rotational speed, the control unit 21 determines S501, by means of the data in the storage unit 213, a desired pressure difference across the cylinders 301, 302. In a closed loop control, the control unit 21 sends signals to the exhaust flow restriction elements 601, 602, based on the desired pressure difference across the cylinders 301, 302 and feedback signals from the air guide pressure sensor 211 and the exhaust guide pressure sensor 214. In the closed loop control, the feedback signals are compared S701 to the desired pressure difference across the cylinders 301, 302. Moving S601 the exhaust flow restriction elements 601, 602 towards respective fully closed positions will increase the pressure difference across the cylinders 301, 302, and vice versa.

The engine speed is continuously or repetitively determined S34. If the engine speed is above the predetermined threshold value, the following steps are performed:

The control unit 21 determines, by means of the data in the data storage unit 213, a setting for the exhaust flow restriction elements 601, 602, based on the determined values of the engine torque and the engine rotational speed. The exhaust flow restriction elements 601, 602 are adjusted S402 to the determined setting. This adjustment is an open loop adjustment.

The control unit 21 also determines, based on the requested engine torque and the engine rotational speed, a setting for the camshaft phase. In an open loop control, the phase of the camshaft rotation is adjusted S402.

Based on the determined requested engine torque and engine rotational speed, the control unit 21 determines S502 a desired pressure difference across the cylinders 301, 302. In a closed loop control, the control unit 21 sends signals to the air flow restriction element 903 in the air guide 901 so as to adjust S602 the air flow restriction element 903, based on the desired pressure difference across the cylinders 301, 302 and feedback signals from the air guide pressure sensor 211 and the exhaust guide pressure sensor 214. In the closed loop control, the feedback signals from the air guide pressure sensor 211 and the exhaust guide pressure sensor 214 are compared S702 to the desired pressure difference across the cylinders 301, 302.

Figure 7:
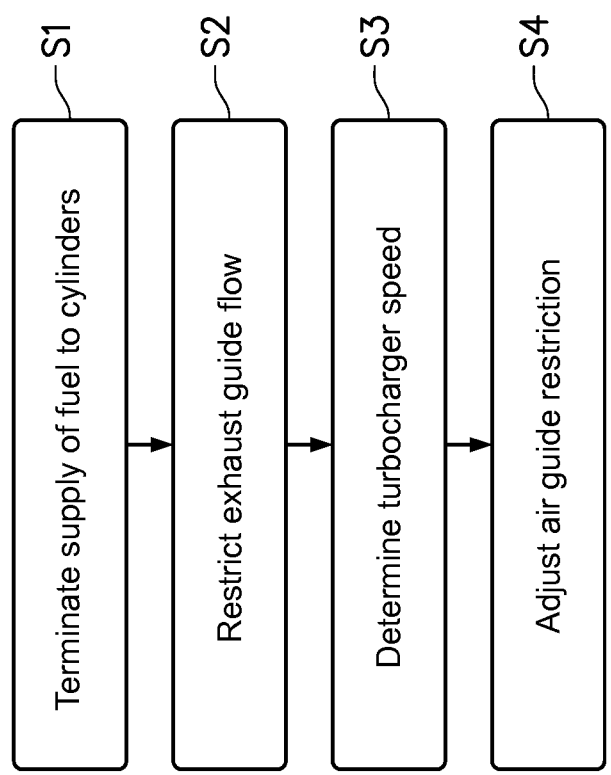
FIG. 7 is a block diagram depicting steps in a method of controlling the engine in FIG. 2, according to a further embodiment of the invention.

FIG. 7 shows a method of controlling the engine 1 in FIG. 2, according to a further embodiment of the invention. The method comprises controlling the engine to provide a braking torque. This control comprises terminating S1 the supply of fuel to the cylinders 301, 302, restricting S4 the flow through the exhaust guides 501, 502, and restricting S6 the flow through the air guide 901. The control of the engine to provide a braking torque also comprises determining S5 a value of a rotational speed of the turbocharger 4, and adjusting S6, in dependence on the determined turbocharger rotational speed value, the restriction of the flow through the air guide 901, and/or the restriction of the flow through the exhaust guide 501, 502.

Figure 8:
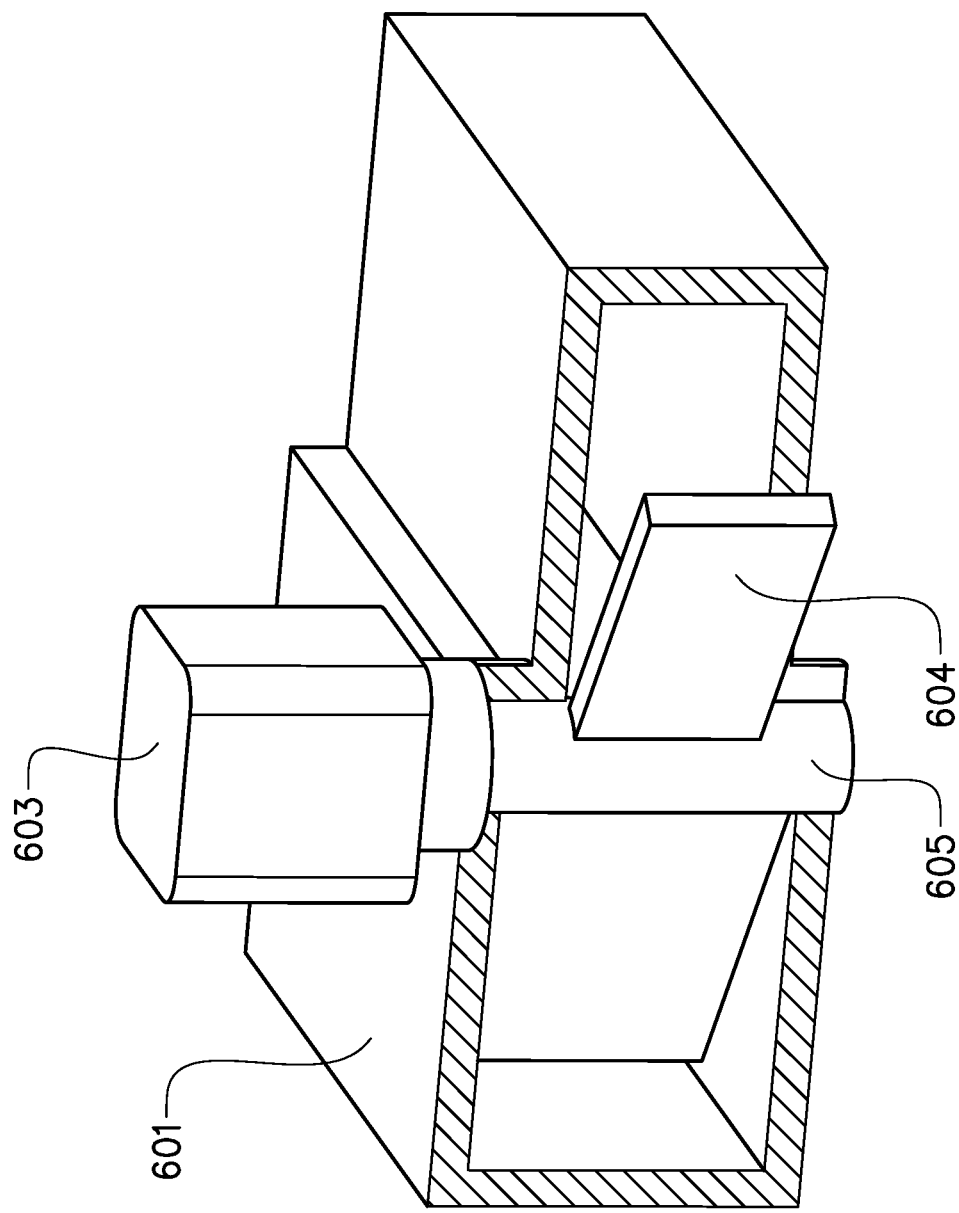
FIG. 8 shows an example of an exhaust flow restriction element.

FIG. 8 shows an advantageous example of an exhaust flow restriction element 601. The exhaust flow restriction element 601 is a butterfly valve with a flap 604. An exhaust flow restriction actuation assembly 603, comprising a stepper motor, a brushless motor or a pneumatic motor, is provided to adjust the exhaust flow restriction element 601, i.e. to adjust the angular position of the flap 604 around an axle 605. The flap 604 is non-symmetric, i.e. the extension of the flap is larger on one side of the axle 605 than on the other side. As a result, the exhaust flow restriction element is arranged to assume, upon a fault in the exhaust flow restriction actuation assembly 603, a position in which the exhaust flow restriction element does not restrict or block the flow through the exhaust guide.

It is to be understood that the present invention is not limited to the embodiments described above and illustrated in the drawings; rather, the skilled person will recognize that many changes and modifications may be made within the scope of the appended claims.

The invention claimed is:

1. A method of controlling an internal combustion engine in a vehicle comprising a cylinder, a fuel system for supplying fuel to the cylinder, an air guide arranged to guide an air flow to the cylinder, and an exhaust guide arranged to guide a gas flow from the cylinder, the method comprising controlling the engine to provide a braking torque, the control comprising, terminating the supply of fuel to the cylinder, restricting the flow through the exhaust guide, and restricting the flow through the air guide, wherein the control of the engine to provide a braking torque also comprises determining, by means of a turbocharger rotational speed sensor, a value of a rotational speed of a turbocharger of the engine, characterized by adjusting, in dependence on the determined turbocharger rotational speed value, the restriction of the flow through the air guide, the adjustment of the restriction of the flow through the air guide being a closed loop adjustment, wherein the turbocharger rotational speed is a feedback parameter in the closed loop adjustment.

2. A method according to claim 1, wherein a desired value of the turbocharger rotational speed is determined based on one or more of the engine rotational speed, a requested engine braking torque, and a current engine braking torque.

3. A method according to claim 1, wherein restricting the flow through the exhaust guide comprises adjusting an exhaust flow restriction element in the exhaust guide, and the exhaust guide is arranged to guide the gas flow from the cylinder to a turbine of the turbocharger, wherein the exhaust flow restriction element is arranged between the cylinder and the turbine.

4. A method according to claim 1, wherein restricting the flow through the exhaust guide comprises adjusting a throttle valve in the exhaust guide, and/or adjusting a flow adjustment function at a turbine of a variable geometry turbocharger of the engine, wherein the exhaust guide is arranged to guide the gas flow from the cylinder to the turbine.

5. A method according to claim 1, wherein adjusting the restriction of the flow through the air guide comprises adjusting a throttle valve in the air guide.

6. A computer comprising a computer program for performing the steps of claim 1 when the program is run on the computer.

7. A non-transitory computer readable medium carrying a computer program for performing the steps of claim 1, when the program product is run on a computer.

8. A control unit configured to perform the steps of the method according to claim 1.

9. A method according to claim 1, comprising adjusting the restriction of the flow through the exhaust guide in dependence on one or more of fire engine rotational speed, a requested engine braking torque, and a current engine braking torque.

10. A method according to claim 9, wherein the adjustment of the restriction of the flow through the exhaust guide is an open loop adjustment.

\* \* \* \* \*